United States Patent Office 3,035,681
Patented May 22, 1962

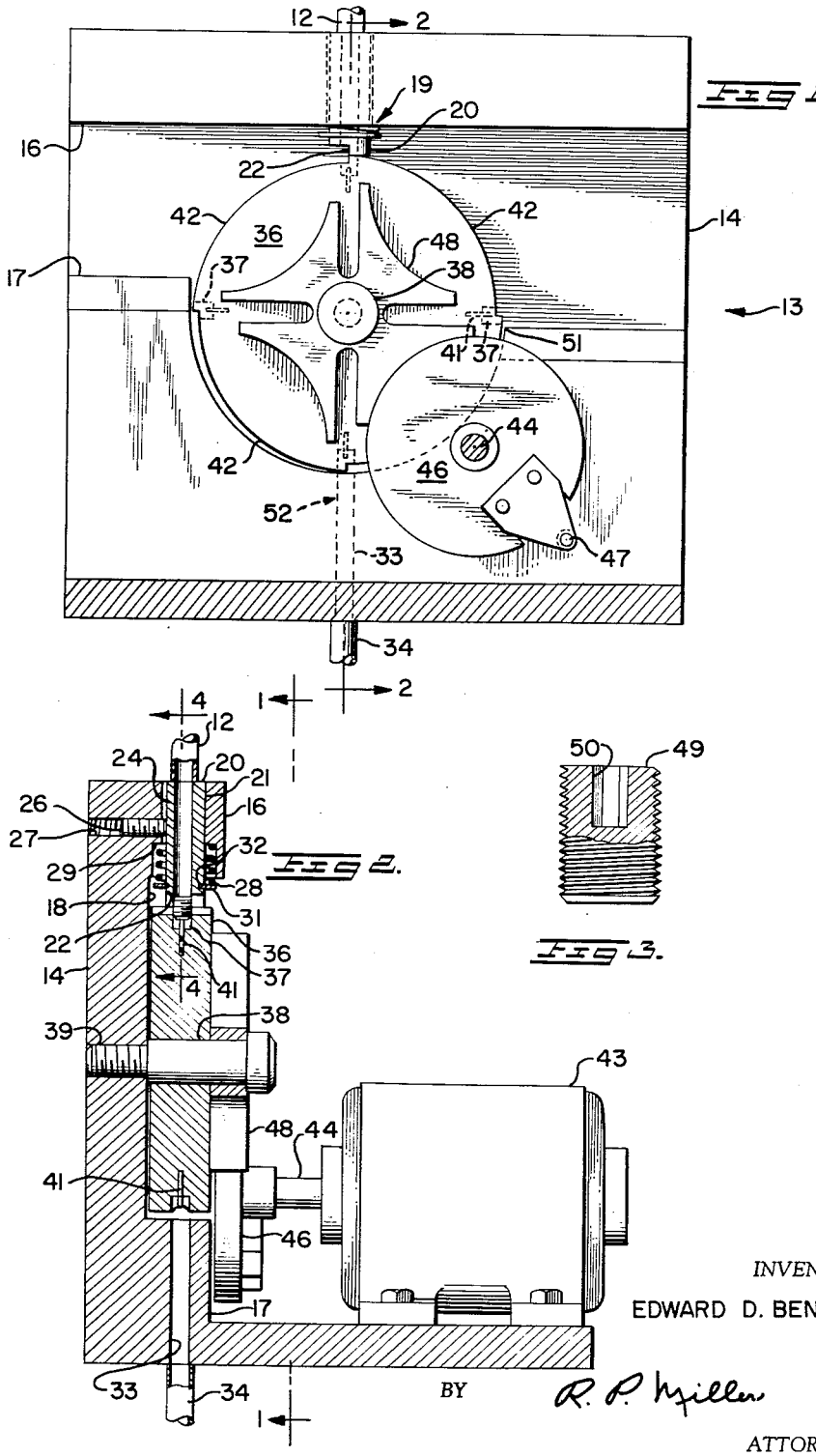

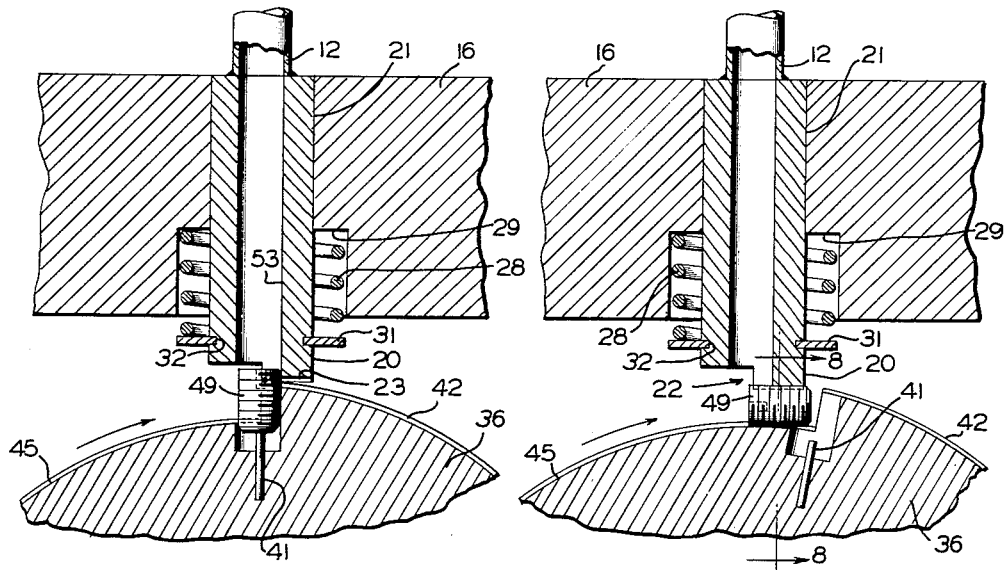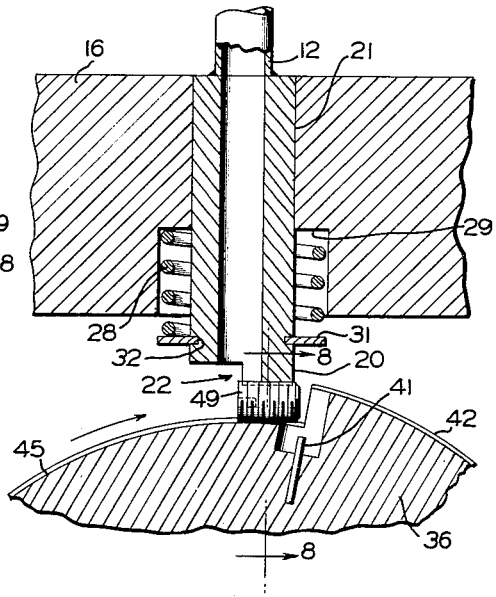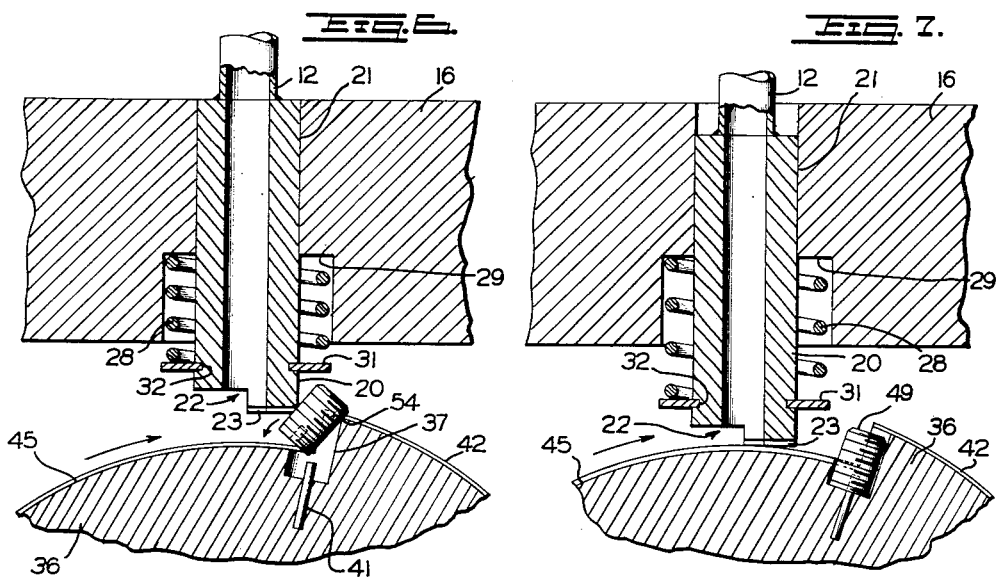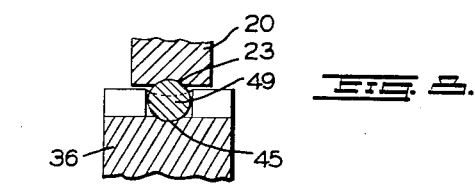

3,035,681
SET SCREW ORIENTER
Edward D. Bennett, Union, N.J., assignor to Western Electric Company, Incorporated, New York, N.Y., a corporation of New York
Filed Apr. 27, 1960, Ser. No. 24,947
6 Claims. (Cl. 198—33)

This invention relates to apparatus for orienting articles and more particularly to apparatus for orienting and selectively feeding articles each having a bore formed therein.

In the feeding of articles, it is frequently desirable to present the articles to a work station in a predetermined orientation. This renders it necessary to sense articles in a random orientation and to move those articles into the predetermined orientation prior to presentation to the work station. This is not a serious problem where the work is manually moved to the work station, but it is a problem when the articles are to be advanced automatically from a supply source to the work station.

An object of this invention is to provide new and improved apparatus for orienting articles.

Another object of this invention is to provide apparatus for automatically orienting bored articles advanced in a random manner from a supply source so that the articles may be loaded onto a feed device in a predetermined orientation.

An additional object of this invention resides in apparatus for advancing articles wherein articles supplied in a first predetermined orientation are advanced, and those articles supplied in a second predetermined orientation are rotated into said first predetermined orientation and subsequently advanced.

A further object of this invention resides in a disk having circumferentially spaced radial pockets and cams extending between the pockets to cooperate with facilities for rotating into position for reception by the pockets articles supplied to the pockets in an unoriented position.

With these and other objects in mind, the present invention contemplates an orienting member mounted for movement between the terminal end of a supply tube and a rotatable disk having a series of circumferentially spaced pockets. Articles having an axial bore in one end thereof are supplied from the tube and enter the orienting member. An article supplied bore end first passes through the orienting member and enters a pocket. An article supplied solid end first enters the orienting member, passes partially therethrough, and is prevented from fully entering the pocket by a pin which projects from the bottom of the pocket. The article is held between the orienting member and the disk. As the disk rotates to present the next successive pocket to the orienting member, the article abuts the orienting member, is rotated 180 degrees, and enters said next successive pocket. Further rotation of the disk advances the article to a discharge device.

A complete understanding of this invention may be had by referring to the following detailed description and the accompanying drawings illustrating a preferred embodiment thereof, in which:

FIG. 1 is a front elevational view of apparatus for orienting articles according to the invention;

FIG. 2 is a cross-sectional view taken on line 2—2 of FIG. 1 particularly showing the drive mechanism for a disk having circumferentially disposed pockets for receiving oriented articles;

FIG. 3 is a partial cross-sectional view of a bored article which may be oriented by the apparatus shown in the other figures;

FIGS. 4, 5, 6, and 7 are fragmentary sectional views taken on line 4—4 in FIG. 2 showing a sequence of orientation of an article fed closed end first to a pocket in the disk; and FIG. 8 is a fragmentary sectional view taken on line 8—8 in FIG. 5 showing opposed grooves formed in the disc and in an orienting member for aligning an article with the disk during orientation.

Referring in detail to the drawings, a supply tube 12 for feeding articles from an article supply source is shown connected to an article orienting device, generally indicated by the numeral 13. The article orienting device comprises a frame 14 having first and second projecting portions 16 and 17, respectively, and a recessed portion 18. The supply tube terminates at a loading station, generally indicated by the reference numeral 19, in vertical alignment with a cylindrical orienting member or sleeve 20 which is mounted for vertical reciprocation in an aperture 21 in the first projecting portion 16 of the frame 14. The orienting member 20 is bored to provide a passageway for articles 49. The lower portion of the member is machined to provide a cutout 22 and a grooved surface 23. The cylindrical wall of the member 20 is machined to provide a flat surface 24. The flat surface 24 is positioned parallel to the vertical plane of the frame 14 and is frictionally engaged by a screw 26 threaded in an aperture 27 and in the first projecting portion 16 to prevent rotation of member 20 while permitting reciprocatory movement. A helical spring 28 is mounted between a shoulder 29, provided by counterboring the aperture 21, and a washer or snap ring 31 mounted in a groove 32 of the orienting member 20. This spring serves to bias the orienting member downwardly.

A discharge guideway aperture 33 is provided in the second projecting portion 17 of the frame 14 in vertical alignment with the orienting member 20. The discharge guideway aperture 33 is connected to a discharge tube 34 emanating from the frame. A disk 36 having a plurality of equally spaced cylindrical pockets 37 formed in the outer periphery thereof is mounted for rotation about a stud shaft 38 having a threaded section 39 which is threaded into the recessed portion 18 of the frame 14. Each of the pockets 37 has projecting radially from the bottom thereof a pin 41. Between the pockets 37, the peripheral edges of the wheel 36 are formed into cam surfaces 42 which rise from a low point adjacent one pocket to a high point or lobe adjacent the next successive pocket. A groove 45 (FIG. 8) is provided in the cam surfaces 42. The disk 36 is rotated intermittently by Geneva drive means comprising a motor 43 connected to a drive shaft 44, a wheel 46 having a pin 47 mounted thereon, and a star wheel 48 fixed to the stud shaft 38. Continuous rotation of the wheel 46 intermittently advances the star wheel in a well-known manner, thereby intermittently advancing the disk 36. Each indexing of the disk 36 results in the presentation of another pocket 37 to the orienting member 20.

The articles selected to illustrate the invention are set screws 49 (see FIG. 3), each having an axial bore 50 extending from one end. If a screw is fed bore end first, the screw fully enters the pockets 37, the pin 41 entering the bore 50 (see FIG. 7). Subsequent movement of the disk 36 will bring the next successive pocket 37 into alignment with the orienting member 20 and carry away from said member the set screw received in the preceding pocket. The set screw carried in the preceding pocket engages the arcuate surface of the second projecting portion 17 of the frame 14 at an edge 51 and is thereby held in the pocket against the force of gravity. Further rotation of the disk 36 carries the set screw to an unloading station, generally indicated by the reference numeral 52, and into alignment with the discharge guideway aperture 33. The set screw then falls into the discharge guideway aperture 33 in the predetermined orientation and may thereafter be fed through the tube 34 to a work station.

If a set screw 49 is fed from the supply tube 12 and presented by the orienting member 20 to the pocket 37 with its solid end first, the pin 41 in the pocket will prevent the set screw from completely entering the pocket (FIG. 4). Subsequent rotation of the disk 36 moves the set screw 49 against an edge 53 of the orienting member 20, causing the screw to be rotated through the cutout portion 22 of the orienting member into the position shown in FIG. 5, between the grooved surface 23 of the cutout 22 and the groove 45 of the cam surface 42 of the disk 36 (FIG. 8). The orienting member 20, biased downwardly by the spring 28, holds the set screw in this position. Subsequent rotation of the disk 36 and thereby the cam surface 42, causes the set screw and the member 20 to rise against the force of the spring 28. As the disk 36 brings the next successive pocket 37 into alignment with the orienting member 20, the spring-biased surface 23 rotates the set screw around a point 54 (FIG. 6) of the pocket and causes the bore end of the set screw to enter the pocket and surround the pin 41 (FIG. 7). Subsequent rotation of the disk 36 carries the set screw away from the orienting member 20 and toward the guideway discharge aperture 33. Thus a set screw that approached the orienting member closed end first is rotated into a predetermined orientation and dispensed from the tube in the same position as a set screw that approached the orienting member bore end first.

It is to be understood that the above-described arrangements are simply illustrative of an application of the principles of the invention. Numerous other arrangements may be devised by those skilled in the art which will embody the principles of the invention and fall within the spirit and scope thereof.

What is claimed is:

1. An article orienting device having article loading and unloading stations comprising means for feeding articles to the loading station in a first or second predetermined orientation, means for transferring articles positioned in a second predetermined orientation from the loading station to the unloading station, means on said transferring means for precluding transfer of articles in said first predetermied orientation, means at the unloading station for guiding articles received from the transfer means, and a member at the loading station actuated by the transferring means for engaging and rotating articles in said first orientation into said second predetermined orientation for reception by the transfer means.

2. In a device for orienting articles having an open end and a closed end, a frame, means attached to the frame for feeding articles, means adjacent the frame for guiding articles, means mounted for rotation on the frame and receptive to articles fed open end first from the feeding means for transferring said articles to the guide means, means mounted on the frame for intermittently rotating the transferring means, and a member actuated by the transferring means to slide within the frame for orienting articles fed closed end first from the feeding means whereby said last-mentioned articles are oriented for reception by the transfer means.

3. A device for orienting articles having an open end and a closed end comprising a frame, a rotary disk mounted to the frame having a circumferential series of pockets for reception of said articles, means for feeding said articles to the disk, means in each of said pockets for preventing one of said articles from entering the pockets when presented thereto closed end first, a member slidable in the frame and actuated by the disk for orienting one of said articles fed to the pocket closed end first, means mounted on the frame for intermittently rotating the disk, and means for receiving oriented articles from the pockets.

4. In a device for orienting an article having an open end and a closed end, a frame, a vertically disposed orienting member slidably mounted within the frame for receiving an article positioned closed end first, a disk rotatably mounted on the frame having a plurality of spaced circumferential pockets for receiving articles positioned open end first, a pin projecting radially from the bottom of each of said pockets for preventing the complete entry into said pocket of an article positioned closed end first, means for rotating said disk to successively align each pocket with the orienting member, and cam surfaces on the disk between pairs of said pockets for engaging and moving said orienting member, said orienting member having a cutout portion facing opposite to the direction of rotation of the disk to permit an article to rotate onto said cam surface and subsequently into the next successive pocket.

5. In a device for orienting articles having an open end and a closed end, a frame, a disk rotatably mounted on the frame having a circumferential series of pockets for receiving articles disposed open end first, a sleeve slidably mounted within the frame for receiving and presenting articles to the pockets, a pin projecting radially from the bottom of each of said pockets for positioning an article disposed closed end first partially within both said pockets and said sleeve, a cam surface on the circumference of the disk between pairs of pockets, and means for intermittently rotating the disk to align successive pockets with the sleeve, said sleeve having a cutout portion facing opposite to the direction of rotation of the disk to permit an article positioned partially within the pocket and the sleeve to rotate onto said cam surface and into the next successive pocket.

6. In an article orienting device, means for feeding articles in first and second predetermined orientations, means for guiding articles, means having a pocket formed therein receptive to articles in said second orientation for transferring said articles to said guiding means, means provided in said pocket for precluding reception by said pocket of articles in said first orientation, and means rendered effective upon engagement of said precluding means with articles in said first orientation for orienting said articles into said second orientation.

References Cited in the file of this patent
UNITED STATES PATENTS
2,845,164    Stahl  ---------------- July 29, 1958